United States Patent
Baek et al.

(12) 
(10) Patent No.: US 9,110,582 B2
(45) Date of Patent: Aug. 18, 2015

(54) MOBILE TERMINAL AND SCREEN CHANGE CONTROL METHOD BASED ON INPUT SIGNALS FOR THE SAME

(75) Inventors: Sung Hwan Baek, Seoul (KR); Joon Yeong Choe, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 341 days.

(21) Appl. No.: 13/287,410

(22) Filed: Nov. 2, 2011

(65) Prior Publication Data

US 2012/0110501 A1 May 3, 2012

Related U.S. Application Data

(60) Provisional application No. 61/409,667, filed on Nov. 3, 2010.

(30) Foreign Application Priority Data

Aug. 25, 2011 (KR) .................. 10-2011-0085168

(51) Int. Cl.
| | | |
|---|---|---|
| G06F 3/048 | (2013.01) | |
| G06F 3/0488 | (2013.01) | |
| G06F 3/01 | (2006.01) | |
| G06F 3/0481 | (2013.01) | |

(52) U.S. Cl.
CPC ............. *G06F 3/0488* (2013.01); *G06F 3/014* (2013.01); *G06F 3/0481* (2013.01); *G06F 2203/04806* (2013.01)

(58) Field of Classification Search
CPC .................................. G06F 3/048; G06F 3/014

USPC .................................................... 715/800, 865
See application file for complete search history.

(56) References Cited

U.S. PATENT DOCUMENTS

| | | | |
|---|---|---|---|
| 6,535,233 B1 * | 3/2003 | Smith ............................ | 715/856 |
| 2002/0135601 A1 * | 9/2002 | Watanabe et al. ............. | 345/660 |
| 2004/0141014 A1 * | 7/2004 | Kamiwada et al. ........... | 345/848 |
| 2004/0160458 A1 * | 8/2004 | Igarashi et al. ............... | 345/660 |
| 2005/0083299 A1 | 4/2005 | Nagasaka | |
| 2005/0138575 A1 * | 6/2005 | Hashimoto et al. .......... | 715/815 |
| 2010/0013960 A1 * | 1/2010 | Ishii ........................... | 348/240.1 |
| 2010/0149378 A1 * | 6/2010 | Suzuki ...................... | 348/231.99 |
| 2010/0169822 A1 | 7/2010 | Hollemans | |
| 2010/0283730 A1 * | 11/2010 | Miyazaki ...................... | 345/158 |
| 2011/0154196 A1 * | 6/2011 | Icho et al. ..................... | 715/702 |

FOREIGN PATENT DOCUMENTS

| | | |
|---|---|---|
| EP | 2 241 964 A2 | 3/2010 |
| GB | 2 344 037 A | 5/2000 |
| JP | 2007-279637 A | 10/2007 |
| WO | 2010/087203 A1 | 8/2010 |

* cited by examiner

*Primary Examiner* — Anil Bhargava
(74) *Attorney, Agent, or Firm* — Jefferson IP Law, LLP

(57) ABSTRACT

A screen change control method based on input signals and a mobile terminal supporting the same are disclosed. The mobile terminal includes a display panel for outputting a screen assigned to a user function, and a control unit for collecting screen ratio information based on at least one of a proportion of a current screen on the display panel to a full screen assigned to the user function and a ratio of enlargement or reduction by zooming, and for automatically adjusting an amount of screen changes for an input signal according to the screen ratio information.

16 Claims, 6 Drawing Sheets

MOBILE TERMINAL AND SCREEN CHANGE CONTROL METHOD BASED ON INPUT SIGNALS FOR THE SAME

CROSS-REFERENCE TO RELATED APPLICATIONS

This application claims the benefit under 35 U.S.C. §119 (e) of a U.S. Provisional Patent application filed on Nov. 3, 2010 in the U.S. Patent and Trademark Office and assigned Ser. No. 61/409,667, and of a Korean Patent application filed on Aug. 25, 2011 in the Korean Intellectual Property Office and assigned Serial No. 10-2011-0085168, the entire disclosures of which are hereby incorporated by reference.

BACKGROUND OF THE INVENTION

1. Field of the Invention

The present invention relates to touch gesture handling. More particularly, the present invention relates to a method for screen change control based on input signals that can adjust the amount of change in the screen according to current screen status to thereby provide a better user environment and to a mobile terminal supporting the method.

2. Description of the Related Art

A mobile terminal is a terminal that supports various user functions based on mobility. Recently, mobile terminals have entered into widespread use because of their convenience and portability. Mobile terminals may provide various input schemes to support user functions. For example, when a mobile terminal has a touchscreen composed of a touch panel and a display unit, the user may select a specific image displayed on the display unit through the touch panel. The mobile terminal may generate a touch event corresponding to a user action and execute an application program according to the touch event. The mobile terminal may simultaneously operate the touch panel and the display part, perform an operation according to the type and touch point of a touch event on the touch panel, and control the display part to display an image reflecting the operation result.

A mobile terminal supporting a screen magnification feature may present information in various levels of magnification using some or all of the screen. For example, the user may view screen content in detail by zooming in or in entirety by zooming out. However, when screen content is magnified by zooming in, to find a desired information element, the user may have to enter more touch gestures as compared to unmagnified screen content. When screen content is reduced by zooming out, to find a desired information element, the user may have to make more elaborate touch gestures corresponding to the reduction ratio. As a result, the user may be inconvenienced by having to enter more touch gestures or make more elaborate touch gestures according to screen status. In certain screen states, touch actions may cause too severe screen changes, and the user may become dizzy.

SUMMARY OF THE INVENTION

Aspects of the present invention are to address at least the above-mentioned problems and/or disadvantages and to provide at least the advantages described below. Accordingly, an aspect of the present invention is to provide a method for screen change control that can adjust the amount of change in the screen caused by input signals to thereby provide a better user environment and a mobile terminal supporting the method.

In accordance with an aspect of the present invention, a method for screen change control based on input signals is provided. The method includes collecting screen ratio information based on at least one of a proportion of a current screen on a display panel to a full screen assigned to a specific user function and a ratio of enlargement or reduction by zooming, and automatically adjusting an amount of screen changes for an input signal according to the screen ratio information.

In accordance with another aspect of the present invention, a mobile terminal supporting screen change control based on input signals is provided. The terminal includes a display panel for outputting a screen assigned to a user function, and a control unit for collecting screen ratio information based on at least one of a proportion of a current screen on the display panel to a full screen assigned to the user function and a ratio of enlargement or reduction by zooming, and for automatically adjusting an amount of screen changes for an input signal according to the screen ratio information.

According to another aspect of the present invention, a method for controlling a rate of screen changes of a display unit is provided. The method includes obtaining screen ratio information based on at least one of a ratio of a current screen displayed on the display unit to a full screen assigned to a user faction and a zooming ratio, receiving an input signal from a user, the input signal including a screen change event, and changing a screen displayed on the display unit based on the screen change event and the screen ratio information In a feature of the present invention, the screen change control method and the mobile terminal enable the user to easily locate desired information by presenting screen content and controlling screen changes adaptively according to user functions.

In addition, the method enables the user to locate desired information without dizziness by adequately controlling screen changes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
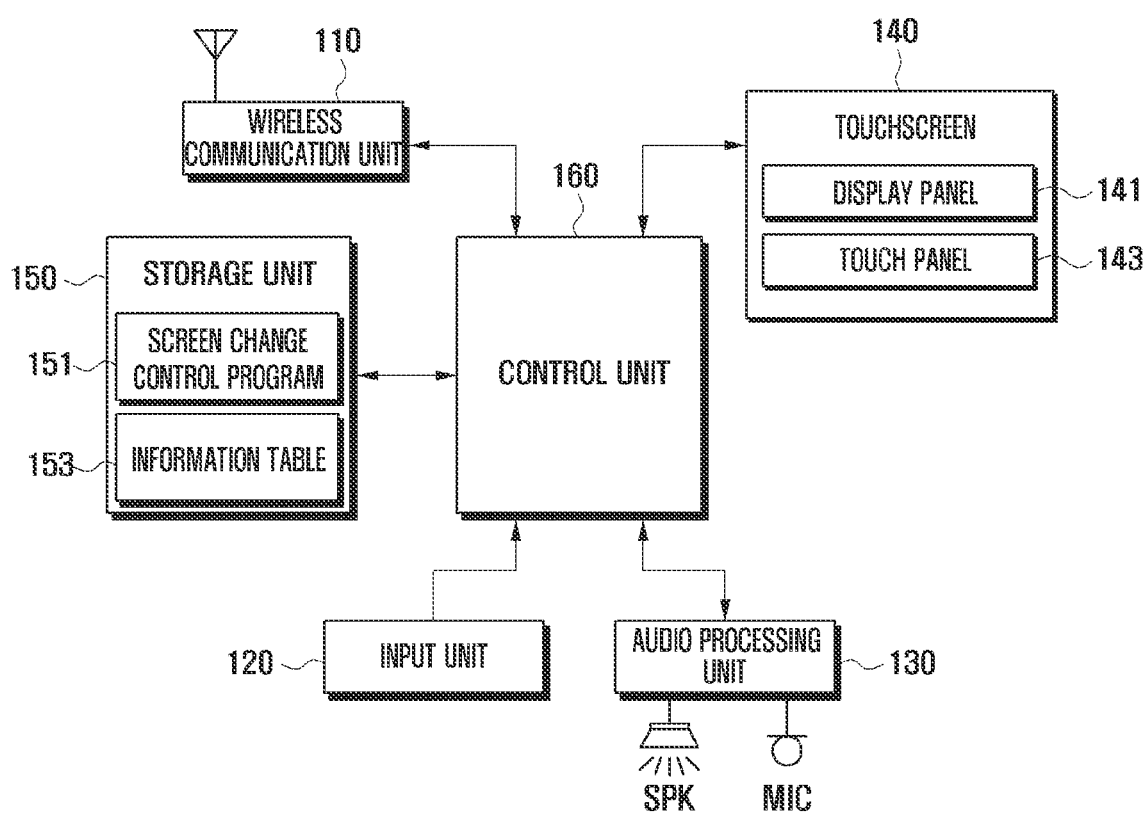
FIG. 1 is a block diagram of a mobile terminal according to an exemplary embodiment of the present invention.

FIG. 1 is a block diagram of a mobile terminal 100 supporting screen change control according to an exemplary embodiment of the present invention.

Referring to FIG. 1, the mobile terminal 100 may include a wireless communication unit 110, an input unit 120, an audio processing unit 130, a touchscreen 140, a storage unit 150, and a control unit 160.

The mobile terminal 100 adjusts screen changes caused by input signals adaptively according to states of screen content on the touchscreen 140 to thereby provide optimized screen display to the user. The mobile terminal 100 may produce different amounts of screen changes even for identical input signals according to screen states so that the user may easily locate desired information. In the following description, it is assumed that input signals correspond to touch events occurring on the touchscreen 140. However, exemplary embodiments of the present invention are not limited thereto. An input signal may be generated by the input unit 120 and the mobile terminal 100 may produce a screen change corresponding to the input signal according to the current screen state.

The wireless communication unit 110 establishes a communication channel for voice, video, and data communication under the control of the control unit 160. The wireless communication unit 110 may establish a communication channel for a voice call, a data call, and a video call to a mobile communication system. To achieve this, the wireless communication unit 110 may include a radio frequency transmitter for upconverting the frequency of a signal to be transmitted and amplifying the signal, and a radio frequency receiver for low-noise amplifying a received signal and downconverting the frequency of the received signal. A user function based on the wireless communication unit 110 may be selected and activated by a touch event generated by a touch panel 143 or by an input signal generated by the input unit 120.

For example, the user may activate a phonebook function to make a call through the wireless communication unit 110. Upon activation of the phonebook function, a phonebook list is displayed on the display panel 141 of the touchscreen 140. The amount of changes in the phonebook list screen on the display panel 141 may vary according to screen ratio information based on at least one of the proportion of the phonebook list screen to the full screen and the enlargement or reduction ratio of the phonebook list screen. In the phonebook list screen, the speed and magnitude of scrolling for an input signal may be adjusted according to the screen ratio information. Adjustment of at least one of the screen change speed and screen change magnitude according to screen ratio information may be applied to various application screens associated with the wireless communication unit 110, such as a Web access screen and a video call screen.

The input unit 120 may generate, according to user requests, input signals for controlling various screens of the mobile terminal 100 and activating an automatic screen change adjustment mode in which the amount of screen changes is adjusted according to screen ratio information. The generated input signals are forwarded to the control unit 160 and may be used as commands for screen display in the automatic screen change adjustment mode. The input unit 120 includes a plurality of alphanumeric and function keys for inputting alphanumeric information and for setting various functions. The function keys may include direction, side, and shortcut keys associated with specific functions. The input unit 120 generates key signals for user settings and for controlling operations of the mobile terminal 100, and forwards the key signals to the control unit 160. The input unit 120 may be realized using a QWERTY, 3*4, or 4*3 keypad having multiple keys. The input unit 120 may also be realized using a QWERTY key map, 3*4 key map, 4*3 key map, menu map, and control key map, which are displayable on the touchscreen 140. When the touchscreen 140 is a full touchscreen, the input unit 120 may include a smaller number of keys, such as side keys formed at sides of the case of the mobile terminal 100.

The audio processing unit 130 includes a speaker SPK for outputting audio data during a call, audio data contained in a message, and audio data generated from playback of a file stored in the storage unit 150, and a microphone MIC for collecting an audio signal such as a voice signal during a call. The audio processing unit 130 may output a voice message for guiding selection of the automatic screen change adjustment mode, and output sound effects corresponding to touch events occurring on the touch panel 143. Output of the voice message and sound effects may be omitted according to user settings.

The touchscreen 140 includes a display panel 141 and a touch panel 143. The touch panel 143 may be placed on the front surface of the display panel 141. The size of the touchscreen 140 may be determined by the size of the touch panel 143.

The display panel 141 displays various menus of the mobile terminal 100, information input by the user, and information to be provided to the user. For example, the display panel 141 may output various screens related to usage of the mobile terminal 100, such as an idle screen, menu screen, message composition screen and call handling screen. The display panel 141 may be realized using a Liquid Crystal Display (LCD) device or an Organic Light Emitting Diodes (OLED) device. The display panel 141 may be placed above or below the touch panel 143. The display panel 141 may output various application screens in relation to activation of application programs. Screen content on the display panel 141 may be changed in response to input signals from the input unit 120 and the touch panel 143. The amount of screen changes in response to a drag event, sweep event, or scroll event from the input unit 120 or the touch panel 143 may be automatically adjusted according to screen ratio information based on the current screen on the display panel 141. The screen ratio information may be defined based on the default size of a screen to be output on the display panel 141. The default size of a screen may be determined by the designer or provider. The automatic screen change adjustment mode may be applied to various screens that are modifiable by a drag event, sweep event, or scroll event (described below) and by the zooming function.

The touch panel 143 is placed above and/or below the display panel 141, and may generate a touch event according to contact with an object or movement distance of an object and forward the generated touch event to the control unit 160. Sensing elements of the touch panel 143 are arranged in a matrix form, and send information on the coordinates and type of a touch event occurring on the touch panel 143 to the control unit 160. The control unit 160 may analyze the coordinates and type information of the touch event from the touch panel 143 and control screen changes accordingly. The touch panel 143 generates screen change events for modifying screen content according to user actions. The touch panel 143 may generate a drag event, a sweep event, a scroll event, or the like corresponding to a touch gesture of the user. The drag event may correspond to a touch action that moves a preset distance after touch down on the touch panel 143. The sweep event may correspond to a touch action that moves a preset distance with acceleration from touch down to touch release on the touch panel 143. The scroll event may correspond to a touch action that moves a preset distance with or without acceleration from touch down to touch release on the touch panel 143. The drag event, sweep event, and scroll event are generated by similar touch gestures of the user, and are categorized as screen change events. However, the screen change events are not limited to the above events, and may further include other touch events generating screen changes, such as a pinch zoom event or a multi-touch event.

The storage unit 150 may store application programs realizing functions of the mobile terminal 100, as well as key maps, menu maps, and information on the partial touch lock release zone for proper operation of the touchscreen 140. The key maps and menu maps may take various forms. For example, the key maps may correspond to various keyboard layouts including 3*4 and QWERTY layouts, and may include a control key map for controlling execution of an activated application program. The menu maps may include a menu map for controlling execution of an activated application program. The storage unit 150 may include a program region and a data region.

The program region may store an Operating System (OS) for booting and operating components of the mobile terminal 100, application programs for call-related functions, a web browser for accessing a web server on the Internet, application programs for playback of various files and MP3 data, application programs for viewing still images like photographs and moving images, and application programs for the phonebook function. The program region may also store a screen change control program 151.

The screen change control program 151 may include a routine for enabling activation of the automatic screen change adjustment mode, an interface support routine for setting the amount of screen changes based on at least one of the screen change speed and screen change magnitude, and an interface support routine for setting the amount of screen changes as to an application program. The screen change control program 151 may further include a routine for identifying the type of an active application program and for collecting screen ratio information based on at least one of the proportion of the application screen to the full screen and the ratio of enlargement or reduction by zooming, a routine for determining screen change information including at least one of the screen change speed and screen change magnitude according to the screen ratio information, and a routine for producing screen changes based on the screen change information in response to an input signal.

The data region is an area that stores data generated in the course of using the mobile terminal 100, and may store phonebook information, one or more icons associated with widgets, and various content. The data region may store user input from the input unit 120 or the touch panel 143. The data region may store an information table 153 to support the automatic screen change adjustment mode. The information table 153 contains screen change information for screen states. For a specific application program, the screen change information may indicate the amount of screen changes in response to an input signal according to screen ratio information based on the proportion of the application screen to the full screen, and indicate the amount of screen changes in response to an input signal according to screen ratio information based on the ratio of enlargement or reduction by zooming.

For example, when the screen ratio information for the full or default screen is set to 5 (or 4), the screen change information at the full or default screen may be set to 5 (or 4). The information table 153 contains values of the screen change information for values of the screen ratio information. In this case, values of 5 and 4 are applied to at least one of the screen change speed and the screen change magnitude. Actual screen change speed and magnitude may be realized according to properties of a particular screen or design considerations. The information table 153 may contain information on types of application programs, to which the automatic screen change adjustment mode is applied, together with screen change information corresponding to screen ratio information of the application programs. Accordingly, when an application program registered in advance or by the user is executed, the automatic screen change adjustment mode may be activated. When the automatic screen change adjustment mode is applied by default, application type information of the information table 153 is not required.

The control unit 160 controls supply of power to the components of the mobile terminal 100 for initialization. The control unit 160 controls various signal flows between the components to support the automatic screen change adjustment mode. To achieve this, the control unit 160 may have a configuration as shown in FIG. 2.

Figure 2:
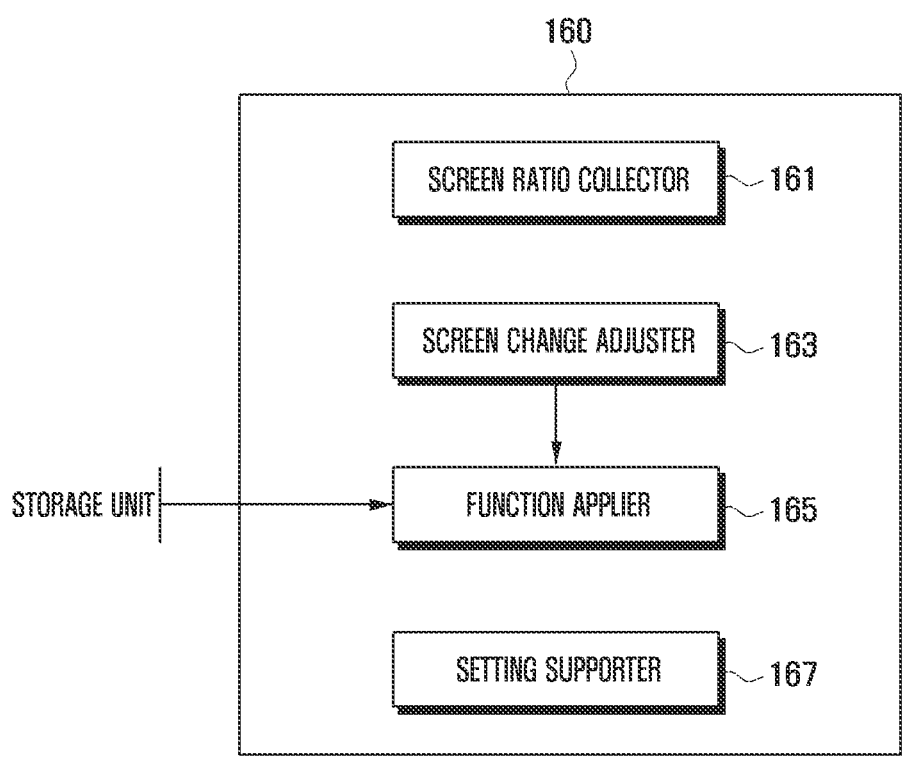
FIG. 2 illustrates the configuration of a control unit of the mobile terminal in FIG. 1 according to an exemplary embodiment of the present invention.

FIG. 2 illustrates the configuration of the control unit 160 of the mobile terminal 100 according to an exemplary embodiment of the present invention.

Referring to FIG. 2, the control unit 160 may include a screen ratio collector 161, a screen change adjuster 163, a function applier 165, and a setting supporter 167.

The screen ratio collector 161 collects, for a currently active application program, screen ratio information based on the proportion of the current application screen on the display panel 141 to the full screen. For example, when a screen provided by a Web server is assumed to have a full screen size of 10, the current screen output on the display panel 141 may be smaller than the full screen having a size of 10 depending upon properties of the Web server. In the case of a phonebook list screen, when the full screen is assumed to have a length of 10, the current screen output on the display panel 141 may contain some of the items in the whole phonebook list. In the case of a map screen, when the full screen is assumed to have a size of 10, the current screen output on the display panel 141 may be smaller than the full screen. In the case of a map, while the full screen is fixed, the current screen output on the display panel 141 may be enlarged or reduced. As such, the screen ratio collector 161 may collect screen ratio information based on the proportion of the current application screen on the display panel 141 to the full screen, and may collect screen ratio information based on the ratio of enlargement or reduction by zooming with reference to a default sized screen. The screen ratio collector 161 may forward the collected screen ratio information to the screen change adjuster 163. The screen ratio collector 161 may identify the type of an application program that currently outputs screen data to the display panel 141, and forward the type information to the screen change adjuster 163.

The screen change adjuster 163 adjusts at least one of the screen change speed and screen change magnitude based on the screen ratio information and application type information from the screen ratio collector 161. To achieve this, the screen change adjuster 163 may read the information table 153 from the storage unit 150, and control an operation to adjust at least one of the screen change speed and screen change magnitude as to an input signal according to the screen ratio information. As described above, the information table 153 may contain values of screen change information corresponding to values of screen ratio information. In the information table 153, screen change information may be set to different values for different application types. Accordingly, when the screen change information is set to have different values for different application types, the screen change adjuster 163 may obtain the application type information from the screen ratio collector 161 to set a screen change value accordingly. When the screen change information is set independently of application types, the screen change adjuster 163 may set screen change values according to the screen ratio information.

The function applier 165 may apply a screen change value set by the screen change adjuster 163 to at least one of the screen change speed and screen change magnitude for an input signal. For example, when a screen change event like a scroll event or a sweep event is generated on the touchscreen 140, the function applier 165 may adjust the amount of screen changes due to the scroll event or sweep event according to the screen change value that is set by the screen change adjuster 163 in consideration of the current screen ratio information. Screen changes caused by the function applier 165 are described below.

The setting supporter 167 supports setting of screen change values. To achieve this, the setting supporter 167 may provide a menu, widget, or user interface window for setting screen change values according to screen ratio information. When the user selects a menu item or widget for adjusting screen change values, the setting supporter 167 may output a user interface window for setting screen change values on the display panel 141. The user may set or adjust screen change values for screen ratio values utilizing the user interface window. The user may set different screen change values for different application types or identical screen change values for all application programs. The user interface window may show at least one of a screen change speed and screen change magnitude to which a specific screen change value is to be applied. The user interface window may provide a preview screen for a screen change value set by the user so that the user may immediately identify the amount of screen changes caused by the set screen change value. Accordingly, the user may readily set screen change values for screen change events through the user interface window. When the user finishes setting of screen change values and application types, the setting supporter 167 may save the settings in the storage unit 150. The setting supporter 167 may update the information table 153 based on the user's settings.

As described above, the mobile terminal 100 makes screen changes in response to input signals from the user so that the user may readily recognize screen content by adjusting at least one of the screen change speed and screen change magnitude according to screen ratio information. Accordingly, the mobile terminal 100 enables the user to more comfortably locate desired information and may prevent dizziness due to screen changes. In addition, it is possible to suppress an unnecessary depth of selections caused by too fast or too slow screen changes during browsing of information.

Figure 3:
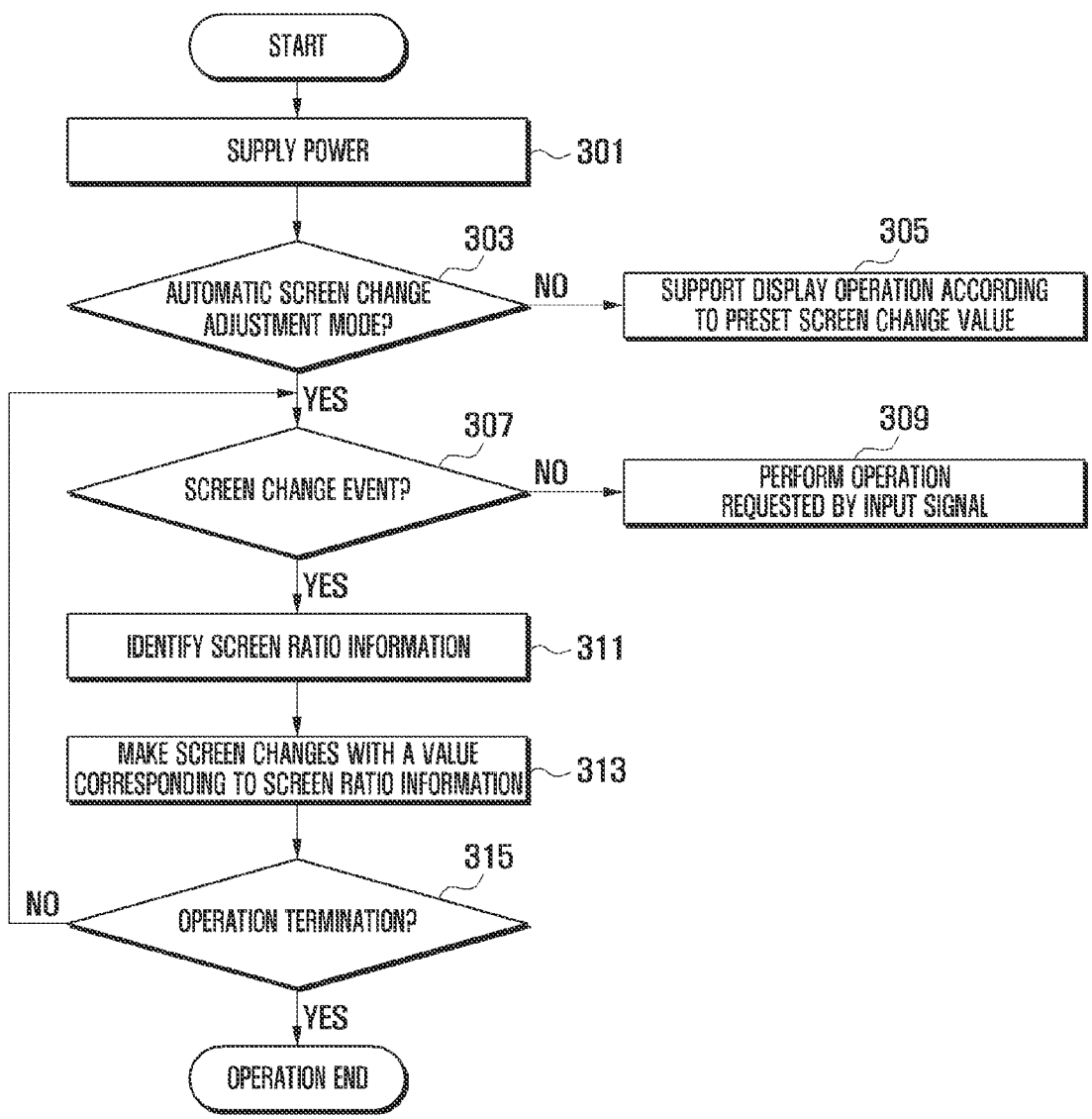
FIG. 3 is a flowchart of a method for screen change control according to an exemplary embodiment of the present invention.

FIG. 3 is a flowchart of a method for screen change control according to an exemplary embodiment of the present invention.

Referring to FIG. 3, the mobile terminal 100 is turned on and the control unit 160 controls power supply from a power supply unit (such as a battery) to other components of the mobile terminal 100 in step 301.

The control unit 160 determines whether the automatic screen change adjustment mode is activated in step 303. When the automatic screen change adjustment mode is not activated, the control unit 160 supports screen display as to an input signal according to a preset screen change value in step 305. The automatic screen change adjustment mode may be activated by default. When the automatic screen change adjustment mode is supported by default, step 303 may be omitted.

When the automatic screen change adjustment mode is activated or supported by default, the control unit 160 determines whether an input signal is a screen change event for screen change in step 307. Screen change events are an input signal causing a screen change, and may include a drag event, a sweep event, a scroll event, a page turning event, and a screen positioning event. When the input signal is not a screen change event, the control unit 160 performs an operation requested by the input signal in step 309.

When the input signal is a screen change event, the control unit 160 identifies screen ratio information in step 311, and controls an operation to make screen changes at a speed and magnitude corresponding to the screen ratio information in step 313. To achieve this, the control unit 160 may examine the size of the full screen assigned to the current user function and the size of the current screen on the display panel 141 and compute the proportion of the current screen to the full screen to obtain the screen ratio information. Alternatively, the control unit 160 may identify the zooming ratio of the current screen on the display panel 141 and use the zooming ratio as screen ratio information. Thereafter, the control unit 160 may identify a screen change value corresponding to the current screen ratio information with reference to the information table 153 pre-stored in the storage unit 150, and control an operation to make screen changes based on the screen change value and properties of the current screen change event. In the information table 153, screen change values indicate the amount of screen changes according to types and properties of screen change events. For example, for a sweep touch action, a screen change value may indicate a scrolling speed and magnitude of a screen according to the distance of the sweep touch action at a given screen ratio value.

The control unit 160 determines whether an input signal requesting operation termination is generated in step 315. When an input signal requesting operation termination is not generated, the control unit 160 returns to step 307 and continues processing.

Figure 4:
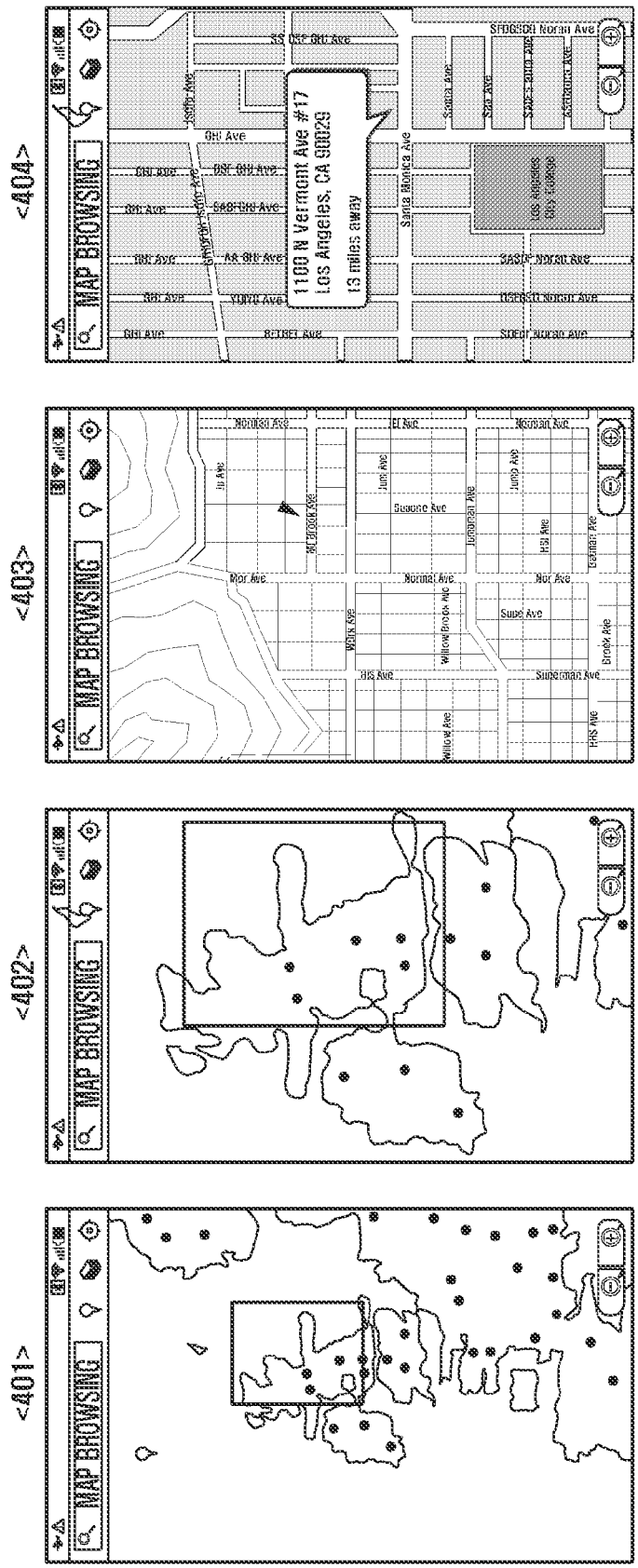
FIG. 4 is a first screen representation for controlling an amount of screen change according to an exemplary embodiment of the present invention.

FIG. 4 is a first screen representation for controlling an amount of screen change according to an exemplary embodiment of the present invention.

The user of the mobile terminal 100 may generate an input signal for activating a location finding function or a map search function. The mobile terminal 100 may output a map screen on the display panel 141. The mobile terminal 100 may output a map screen at a preset scale or user requested scale as shown in FIG. 4. For example, the mobile terminal 100 may output a map screen 401 of a first scale on the display panel 141, a map screen 402 of a second scale, a map screen 403 of a third scale, and a map screen 404 of a fourth scale. To transition from the map screen 401 to the map screen 402, the user may generate an input signal for enlargement by entering an enlargement button at a lower right portion or by making a pinch zoom-in gesture. The user may generate an input signal for enlargement in the same way to transition from the map screen 402 to the map screen 403.

The mobile terminal 100 may set different screen change values for different map scales and make a different amount of screen changes as to a screen change event for location search according to map scales. For example, when a sweep event for shifting the map is generated in the map screen 401, the mobile terminal 100 may make a screen change at a first speed and magnitude so that different locations are viewed after map shifting. The map scales may be used as screen ratio information.

When a sweep event for shifting the map is generated in the map screen 402, the mobile terminal 100 may make a screen change at a second speed and magnitude. When a screen change event is generated in the map screen 403, the mobile terminal 100 may make a screen change at a third speed and magnitude. When a screen change event is generated in the map screen 404, the mobile terminal 100 may make a screen change at a fourth speed and magnitude. The first to fourth speeds may differ from each other, and the first to fourth magnitudes may differ from each other. For example, the first speed may be greater than the fourth speed and the first magnitude may be greater than the fourth magnitude, or the first speed may be less than the fourth speed and the first magnitude may be less than the fourth magnitude. When the fourth speed is set to be greater than the first speed and the fourth magnitude is set to be greater than the first magnitude, the user may perform map search more rapidly in a higher-scale map screen like the map screen 404. Accordingly, the user may rapidly browse larger areas to locate a desired location in a higher-scale map screen like the map screen 404 while entering a reduced number of screen change events.

Figure 5:
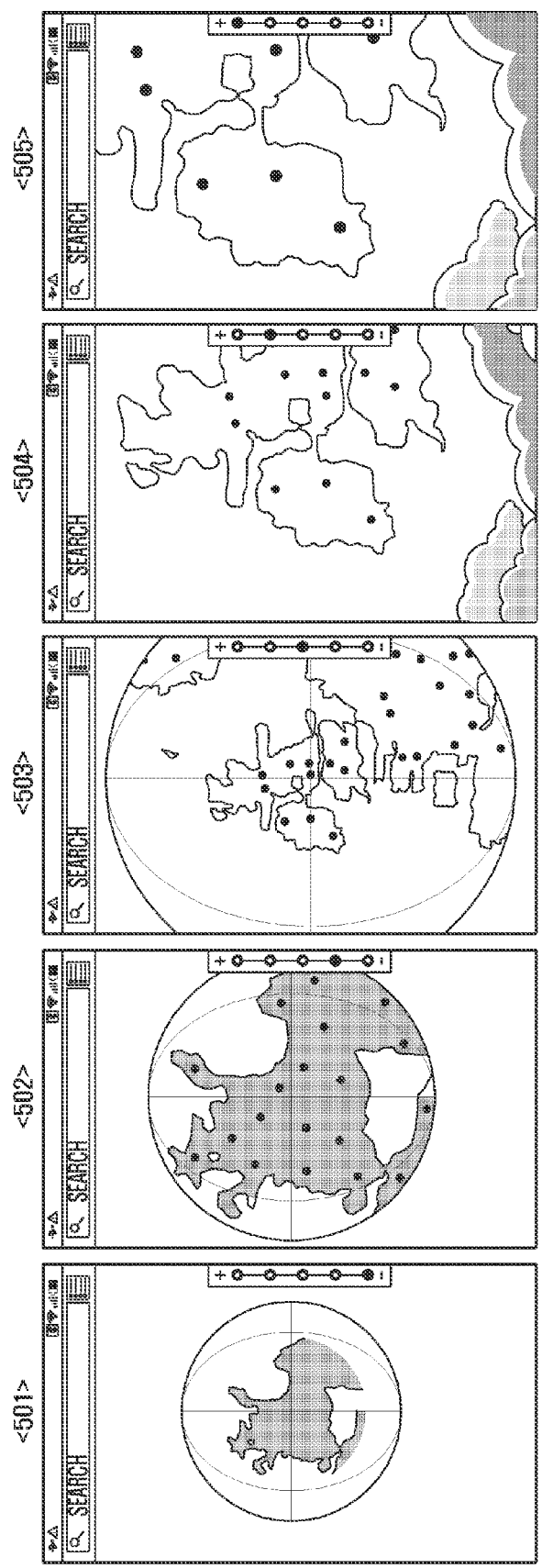
FIG. 5 is a second screen representation for controlling an amount of screen change according to an exemplary embodiment of the present invention.

FIG. 5 is a second screen representation for controlling an amount of screen change according to an exemplary embodiment of the present invention.

Referring to FIG. 5, an output of map information as a three dimensional (3D) map is presented on the display panel 141. A 3D globe map is presented in each of map screens 501 to 505 on the display panel 141. When a screen change event like a sweep event occurs on the touchscreen 140, the globe map displayed on the display panel 141 rotates. Screen changes occurring on the map screens 501 to 505 are similar, but the rotation speed and magnitude of the globe map may be adjusted according to screen ratio information in the map screens 501 to 505.

For example, when a sweep event is generated in the map screen 501, the mobile terminal 100 may generate a screen change by rotating the globe map at a first speed and magnitude. When a sweep event is generated in the map screen 502, the mobile terminal 100 may generate a screen change by rotating the globe map at a second speed and magnitude. Similarly, for the map screen 503, the mobile terminal 100 may generate a screen change by rotating the globe map at a third speed and magnitude. For the map screen 504, the mobile terminal 100 may generate a screen change by rotating the globe map at a fourth speed and magnitude. For the map screen 505, the mobile terminal 100 may generate a screen change by rotating the globe map at a fifth speed and magnitude.

The rotation speed and magnitude of the globe map be automatically varied according to the size of the globe map. For example, when the user generates an input signal for map enlargement like a pinch zoom-in event in the map screen 501, the mobile terminal 100 may output a screen like the map screen 502 on the display panel 141 and automatically control an operation so that a screen change event may produce a screen change with respect to the second speed and magnitude. In response to a request for screen enlargement or reduction from the user, the mobile terminal 100 may automatically update the screen change information according to the current screen ratio information. For identical screen change events, the mobile terminal 100 may produce different amounts of screen changes according to the current screen ratio information. Accordingly, the user may more rapidly locate desired information while entering a reduced number of screen change events in comparison with existing search methods.

Figure 6:
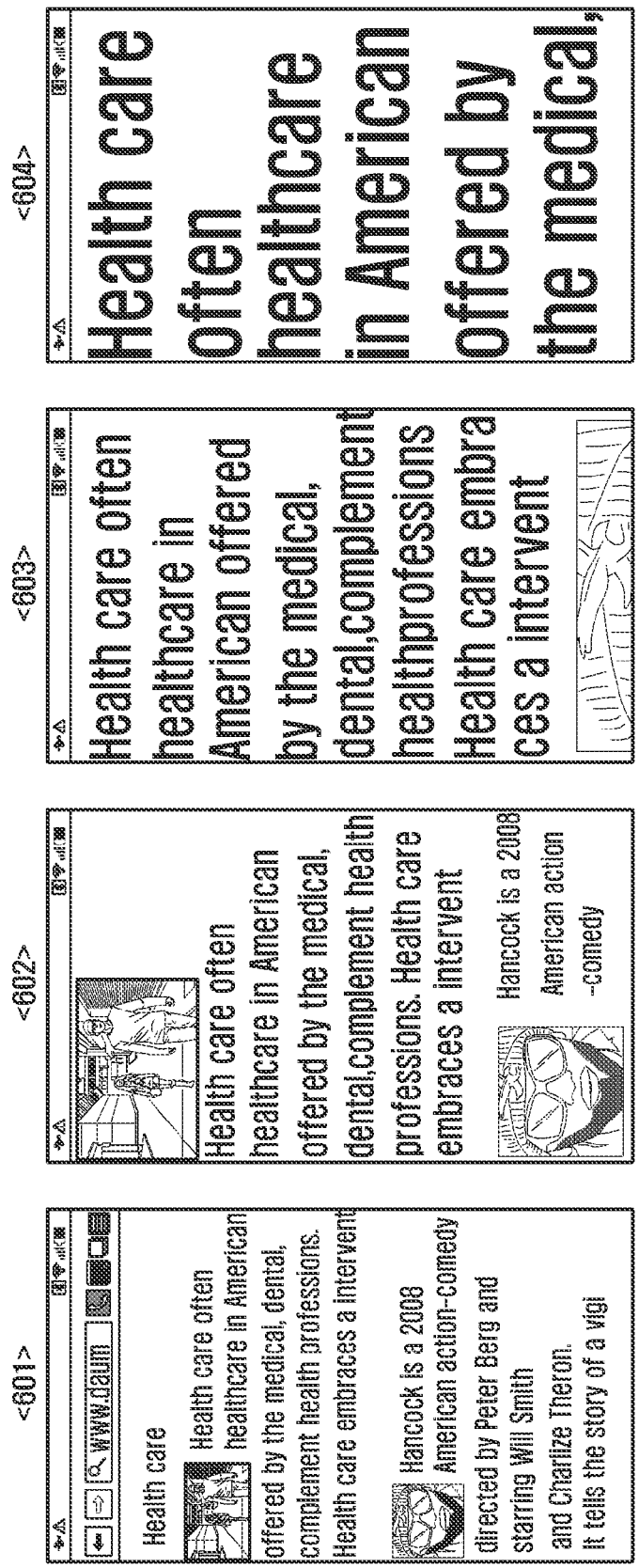
FIG. 6 is a third screen representation for controlling an amount of screen change according to an exemplary embodiment of the present invention.

FIG. 6 is a third screen representation for controlling an amount of screen change according to an exemplary embodiment of the present invention.

The user may access a Web server using the mobile terminal 100, and the Web server may provide a webpage of a given size to the mobile terminal 100. The mobile terminal 100 may output the received webpage on the display panel 141 at a preset screen ratio. The mobile terminal 100 may adjust the size of a webpage screen on the display panel 141 according to an input signal from at least one of the input unit 120 and the touchscreen 140.

For example, when an input signal for screen enlargement is generated while a webpage screen 601 is output on the display panel 141, the mobile terminal 100 may output an enlarged screen like a webpage screen 602. Similarly, for subsequent input signals, the mobile terminal 100 may successively output enlarged screens like webpage screens 603 and 604. Each of the webpage screens 602 to 604 may correspond to an enlargement of a portion or region of the screen at which an input signal for enlargement is entered.

When a screen is output on the display panel 141 in response to an input signal for screen enlargement, the mobile terminal 100 may display the screen so that the amount of screen changes is adjusted according to the current screen ratio information. For example, the mobile terminal 100 may apply first to fourth screen change information to the webpage screens 601 to 604, respectively. To achieve this, the mobile terminal 100 may refer to the information table 153 stored in the storage unit 150 to obtain screen change information corresponding to specific screen ratio information.

For a screen change event like a screen shift event, the screen change information may indicate the movement distance and speed of a screen that is to be moved in response to the screen shift event. The movement distance and speed of a screen to which a screen shift event like a drag event is applied may be determined by the distance and speed of the drag event. When a first screen change value for the webpage screen 601 is less than a fourth screen change value for the webpage screen 604, the amount of movement of the webpage screen 601 caused by a drag event may be less than the amount of movement of the webpage screen 604 caused by a drag event.

As described above, the screen change control method according to exemplary embodiments of the present invention may automatically update the amount of screen changes for a screen when a modification is made to screen ratio information based on the proportion of the current screen on the display panel 141 to the full screen assigned to the corresponding application program. The screen change control method may also automatically update the amount of screen changes for a screen when a modification is made to screen ratio information based on the zooming ratio of the screen on the display panel 141. Accordingly, the screen change control method enables the user to perform information browsing at a suitable screen change speed and magnitude by automatically adjusting the amount of screen changes according to a modification in screen ratio information.

If necessary, the mobile terminal 100 may further include various components. Although not shown, the mobile terminal 100 may further include components such as a short-range communication module for short-range communication, a data communication interface based on wired and wireless communication, an Internet communication module for Internet access, and a digital broadcast receiving module for playing digital broadcasts. With the digital convergence trend, it should be apparent to those skilled in the art that the mobile terminal 100 according to exemplary embodiments of the present invention may further include a unit comparable to the above-described units, and one unit of the mobile terminal 100 may be removed or replaced with another unit.

The mobile terminal 100 according to exemplary embodiments of the present invention may be a device capable of adjusting the amount of screen changes according to screen ratio information, and may be any information and communication appliance or multimedia appliance, such as a mobile communication terminal based on communication protocols supporting various communication systems, a Portable Multimedia Player (PMP), a digital broadcast receiver, a Personal Digital Assistant (PDA), a music player like an MP3 player, a portable game console, a smart phone, a notebook computer, or a handheld computer.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for screen change control based on input signals, the method comprising:
   receiving an input signal including a screen change event for screen change;
   collecting screen ratio information based on at least one of a proportion of a current screen on a display panel to a full screen assigned to a specific user function and a ratio of enlargement or reduction by zooming of the input signal;
   identifying and obtaining, from a stored table, an amount of screen changes based on application type information of a currently executed application program corresponding to the specific user function and the screen ratio information, the stored table comprising a plurality of amounts of screen changes, each of which corresponds to each of a plurality of screen ratio information based on each of a plurality of application type information; and
   automatically adjusting the current screen based on the obtained amount of screen changes.

2. The method of claim 1, further comprising activating an automatic screen change adjustment mode.

3. The method of claim 2, further comprising:
   identifying a type of a currently active user function; and
   determining whether the automatic screen change adjustment mode applies to the identified user function type.

4. The method of claim 1, further comprising:
   identifying the amount of screen changes corresponding to current screen ratio information and the obtained application type information; and
   making screen changes for the input signal according to the identified amount of screen changes.

5. The method of claim 4, wherein the making of the screen changes comprises increasing or decreasing at least one of a screen change speed and a screen change magnitude for an enlarged screen by zooming for the input signal in comparison with a reduced screen.

6. The method of claim 1, wherein the receiving of the screen change event comprises receiving at least one of a sweep event, a scroll event, a drag event and a pinch zoom event occurring on a touchscreen.

7. The method of claim 2, further comprising at least one of:
   outputting a user interface window for selecting an application program to which the automatic screen change adjustment mode is applied; and
   outputting a user interface window for setting a screen change value corresponding to a given screen ratio value.

8. The method of claim 7, further comprising storing information regarding at least one of the selected application program and the set screen change value.

9. A mobile terminal supporting screen change control based on input signals, the terminal comprising:
   at least one of an input unit and a touch panel configured to generate a screen change event for screen change;
   a display panel configured to output a screen assigned to a user function; and
   a control unit configured to:
      collect screen ratio information based on at least one of a proportion of a current screen on the display panel to a full screen assigned to the user function and a ratio of enlargement or reduction by zooming;
      identify and obtain, from a stored table, an amount of screen changes based on application type information of a currently executed application program corresponding to the specific user function and the screen ratio information, the stored table comprising a plurality of amounts of screen changes, each of which corresponds to each of a plurality of screen ratio information based on each of a plurality of application type information; and
      automatically adjust the current screen based on the obtained amount of screen changes.

10. The mobile terminal of claim 9, further comprising a storage unit configured to store screen change information corresponding to the screen ratio information.

11. The mobile terminal of claim 9, wherein the control unit comprises:
   a screen ratio collector configured to collect the screen ratio information, to identify the application type information, and to determine whether a currently active user function has a type to which an automatic screen change adjustment mode applies; and a screen change adjuster configured to adjust the amount of screen changes based on information provided by the screen ratio collector.

12. The mobile terminal of claim 11, wherein the control unit further comprises a function applier configured to control an operation to make screen changes for an input signal based on the amount of screen changes adjusted by the screen change adjuster.

13. The mobile terminal of claim 12, wherein the function applier increases or decreases at least one of a screen change speed and a screen change magnitude for an enlarged screen by zooming for the input signal in comparison with a reduced screen.

14. The mobile terminal of claim 11, wherein the touch panel generates at least one of a sweep event, a scroll event, a drag event, and a pinch zoom event on a touchscreen.

15. The mobile terminal of claim 10, wherein the display panel outputs at least one of a user interface window for selecting an application program to which the automatic screen change adjustment mode is applied and a user interface window for setting a screen change value corresponding to a given screen ratio value.

16. The mobile terminal of claim 15, wherein the control unit comprises a setting supporter configured to store information regarding at least one of the selected application program and the set screen change value in the storage unit.

* * * * *